Patented Aug. 10, 1948

2,446,578

UNITED STATES PATENT OFFICE 2,446,578

METHOD OF SOUND RECORD MANUFACTURE

Clifford Eddison, Haddon Heights, N. J., assignor to Radio Corporation of America, a corporation of Delaware No Drawing. Application October 27, 1944, Serial No. 560,721

1 Claim. (Cl. 106—37)

The present invention relates to the manufacture of sound records and more particularly to a novel compound and process of making records therefrom.

In the making of sound records as practiced today, shellac is mixed with fillers and other gums by the use of a suitable mixing machine, such as the well known Banbury mixer. The disadvantage of such processing resides in the fact that the mixture fails to homogenize in the Banbury mixer. This is due to the fact that shellac has a flow point between 78° and 80° C. and since shellac is present in the highest proportion relative to the other gum and resin constituents, the normal temperature in the Banbury mixer is sufficient to ensure free flowing of the shellac. The other gums or resins, such as copal or congo have a substantially higher melting point and so are only partially fused at the operating temperature of the Banbury mixer and lack of homogeneity between the resins occurs.

An object of the present invention is to provide a compound suitable for making records without using shellac with its unfavorable low melting point, while retaining the more favorable qualities of shellac, namely resistance to wear, flexibility, impact strength, and flexural strength at press temperatures.

In accordance with the present invention a single homogeneous resinous body is premelted at such temperature that the highest melting point resins, gums or plastic bodies will melt to provide, with other plastic bodies or resins, a matrix of well dispersed, truly homogeneous resinous compound wherein the melting point of the highest melting component has been substantially reduced by admixture. This matrix is ground and added to a suitable filler and then Banbury mixed in the normal manner. The resins used to obtain, along with other plastic bodies, some of the desirable physical properties may include rosin, gasoline insoluble, aromatic hydrocarbon soluble extract of pinewood resin, congo and copal gum, cellulose acetate, vinyl compounds, and ethyl cellulose. While the melting point of rosin is approximately 60° C., the melting point of cellulose acetate is greater than 200° C. and the melting point of the above mentioned extract of pinewood resin is about 105° C. and the melting point of methyl abietate is below 80° C. As illustrative of the method of the invention, cellulose acetate, in approximately the proportion of 25%, the said extract of pinewood resin, approximately 60%, and methyl abietate approximately 15%, form the base for the record and are reduced to liquid form by heating them in the following manner: The cellulose acetate, which has the highest melting point, is first heated and reduced to a liquid, then while still applying the heat the said extract of pinewood resin is added to melt and combine with the molten or fluid cellulose acetate, after which the methyl abietate is added to melt and mix with the cellulose acetate and the said extract of pinewood resin. The molten mixture thus formed is allowed to cool into solid form whereupon it is ground, mixed with a suitable filler, such as calcium carbonate, and processed in the usual manner in a Banbury mixer. From the mixer, the processed compound is calendered to sheet form of predetermined thickness to be passed through the machine which stamps out the individual record blanks. Thus, it will be seen that it is possible to employ highly desirable materials for record manufacture, some of which have higher melting points than the available temperatures of a Banbury mixer which operates at temperatures approximately 140° C. By premelting the materials, a resultant compound is obtained which, when cooled, may have a predetermined melting point gauged from the proportion of each separate material and sufficiently low to be properly processed by a Banbury mixer. A record made according to the present invention has all the desirable physical characteristics of a record made with shellac plus the additional essential homogeneous mixture of the materials therein.

What is claimed is:

A method of making a sound record based upon a composition of cellulose acetate, gasoline insoluble, aromatic hydrocarbon soluble extract of pinewood resin, and methyl abietate, comprising melting approximately 25 parts of cellulose acetate, adding approximately 60 parts of said extract of pinewood resin and approximately 15 parts of said methyl abietate, cooling the melt to form a solid composition, grinding the composition into particle form, mixing the ground composition with filler, and processing the resultant composition into record form.

CLIFFORD EDDISON.

REFERENCES CITED

The following references are of record in the file of this patent:

UNITED STATES PATENTS

| Number | Name | Date |
| --- | --- | --- |
| 1,558,175 | Jones | Oct. 20, 1925 |
| 1,744,534 | Edison | Jan. 21, 1930 |
| 2,006,378 | Whyte | July 2, 1935 |
| 2,359,972 | De Bell | Oct. 10, 1944 |
| 2,368,788 | Tinsley | Feb. 6, 1945 |

OTHER REFERENCES

Vinsol Resin—Its Characteristics and Some Suggested Uses, 1939, by Hercules Powder Co. Vinsol Digest, (22 pages).

Hercolyn and Abalyn—Liquid Esters of Abietic Acid, by Hercules Powder Company (14 pages).